United States Patent [19]

Doman et al.

[11] Patent Number: 4,695,736
[45] Date of Patent: Sep. 22, 1987

[54] VARIABLE SPEED WIND TURBINE

[75] Inventors: Glidden S. Doman, Granby, Conn.;
Joseph M. Kos, Holyoke, Mass.;
Kermit I. Harner, Windsor, Conn.;
Eugene D. DiValentin, Enfield,
Conn.; Henry S. Healy, Bloomfield,
Conn.

[73] Assignee: United Technologies Corporation, Hartford, Conn.

[21] Appl. No.: 799,045

[22] Filed: Nov. 18, 1985

[51] Int. Cl.⁴ .............................................. F03D 9/02
[52] U.S. Cl. ...................................... 290/44; 290/55; 322/35; 322/28
[58] Field of Search ............... 290/42, 43, 44, 52, 290/53, 54, 55; 416/132 A, 132 B; 415/1-8; 322/35, 41, 29

[56] References Cited

U.S. PATENT DOCUMENTS

| | | | |
|---|---|---|---|
| 4,160,170 | 7/1979 | Harner et al. | 290/44 |
| 4,161,658 | 7/1979 | Patrick | 290/44 |
| 4,189,648 | 2/1980 | Harner | 290/44 |
| 4,193,005 | 3/1980 | Kos et al. | 290/44 |
| 4,330,743 | 5/1982 | Glennon | 322/29 X |
| 4,400,659 | 8/1983 | Barron et al. | 322/35 X |
| 4,503,673 | 3/1985 | Schachle et al. | 290/44 X |
| 4,525,633 | 6/1985 | Wertheim et al. | 290/44 |
| 4,584,486 | 4/1986 | Quynn | 290/44 |

OTHER PUBLICATIONS

"Variable Rotor Speed for Wind Turbines", by EPRI Electric Power Research Institute AP-4261 (9/85).

Primary Examiner—William M. Shoop, Jr.
Assistant Examiner—Shik Luen Paul Ip
Attorney, Agent, or Firm—Francis J. Maguire, Jr.

[57] ABSTRACT

A variable speed wind turbine includes a frequency converter which converts variable frequency AC from a turbine driven AC generator to fixed frequency AC for delivery to a power grid. The frequency converter is typically an electronic cycloconverter or rectifier-inverter and is also used to control the power flow from the AC generator to the grid which thereby controls the air gap torque between the generator stator and rotor. The turbine speed is maneuvered to increase efficiency by precisely controlling the air gap torque according to a schedule defining sensed generator speed versus sensed generated power.

8 Claims, 6 Drawing Figures

VARIABLE SPEED WIND TURBINE

REFERENCE TO A RELATED APPLICATION

The invention described herein may employ some of the teachings disclosed and claimed in commonly owned co-pending application having U.S. Ser. No. 799,046, filed on the smae day as this application, invented by DiValentin et al, entitled TORQUE CONTROL FOR A VARIABLE SPEED WIND TURBINE, which is hereby expressly incorporated by reference.

TECHNICAL FIELD

This invention relates to wind turbines, and particularly to variable speed wind turbines.

BACKGROUND ART

Various types of wind machines including constant rotor speed and adjustable speed machines are known. Since the turbine-generator is normally directly connected to a fixed frequency electrical power grid constant speed wind turbines have predominated. Variable speed wind turbines cannot be directly connected to the grid because of their variable frequency electrical power output. This necessitates the interposition of a frequency converter between the generator and the grid to make the frequency conversion. Various techniques are well known for such frequency converters including cycloconverters and rectifier-inverters.

In addition, electronic speed control techniques have been developed for all types of motors using the thyristor, or silicon-controlled rectifier (SCR). It has become apparent to wind energy theorists that it is possible to use an adjustable speed AC drive in reverse. In other words, instead of using the adjustable speed drive as a receiver of fixed frequency AC for conversion to variable frequency AC for driving a motor, it is possible to provide the frequency converter with variable frequency AC from an AC generator for conversion to fixed frequency AC for supplying a power grid.

As known in the wind energy art, the kinetic energy available from an oncoming wind stream varies as the size of swept area, density, and cube of the wind velocity. It has been shown that no more than 59% of the energy can be extracted and the ability of any wind turbine to approach that maximum has been named the coefficient of performance, $C_p$. Coefficient of performance is related to the aerodynamic features of a given machine, particularly the tip speed ratio, which is defined as the ratio of tangential speed of the blade tip over the speed of the oncoming wind. If this ratio can be maintained at the machine's peak coefficient of performance by letting rotor speed follow wind speed, the wind turbine becomes highly efficient. In addition, variable speed wind turbines provide the opportunity for short term energy storage. i.e., wind speed transients can be integrated into speed changes. The control strategy for such a wind turbine should be based on electrical adjustment of generator torque.

DISCLOSURE OF INVENTION

The object of the present invention is to provide a variable speed wind turbine having a control strategy based on electrical adjustment of generator torque to maneuver speed to obtain peak performance.

According to the present invention, a variable speed wind turbine system is made of an AC generator driven by a turbine and having a variable frequency AC electrical output connected to a frequency converter which converts the variable frequency AC to a fixed frequency AC for provision to a power grid. A variable speed wind turbine controller is responsive to a sensed generator speed signal and a sensed generator power output signal and provides a generator torque command signal to the frequency converter which in turn controls the air gap torque in the generator by controlling the level of power delivered to the power grid.

In further accord with the present invention, the variable speed wind turbine controller includes a speed maneuvering controller responsive to the sensed power signal for providing a speed reference signal which is compared to the sensed generator speed signal. A difference signal indicative of the difference between the speed reference signal and the sensed generator speed signal is integrated to provide the generator torque command signal for the frequency converter.

In still further accord with the present invention, the frequency converter may include a cycloconverter or a rectifier-inverter package adapted for wind turbine use. In both cycloconverter and rectifier-inverter packages, a trigger circuit will be responsive to the torque command signal from the wind turbine controller and will provide silicon-controlled rectifier (SCR) triggering signals timed according to the magnitude of the torque command signal. The frequency converter will have SCRs either fed directly from the variable frequency AC, in the case of the cycloconverter, or fed by a DC link, in the case of a rectifier-inverter. The SCRs are, in both cases, responsive to the SCR triggering signals. The timing of the triggering signals will control the magnitude of power converted by the frequency converter, and hence the power delivered to the grid. As a result, the air gap torque between the generator stator and rotor is effectively controlled by the generator torque command signal provided by the variable speed wind turbine controller. In effect, however, the variable speed wind turbine controller operates to maneuver the generator speed according to the function defining generator speed versus generator electrical power output. This function is defined in such a way that the speed maneuvers tend to cause the wind turbine to operate on the wind turbine power coefficient versus velocity ratio optimum performance curve substantially at the peak thereof, for increased efficiency. I. e., the velocity ratio is, in effect, held constant by maneuvering the tip speed to maintain a constant relation with wind speed.

In still further accord with the present invention, the variable speed wind turbine controller includes a derivative control responsive to the sensed generator speed signal for providing a damping signal which is summed with the generator torque command signal for damping a selected torsional mode of vibration.

In still further accord with the present invention, the variable speed wind turbine controller includes generator a speed reference schedule, responsive to the sensed generator electrical power signal for providing a generator speed reference signal according to a speed reference signal versus sensed electrical power signal function and includes a summing junction responsive to the speed reference signal and the sensed speed signal for providing a difference signal having a magnitude indicative of the difference in magnitudes between the two. The difference signal is provided to an integral control which provides the generator torque command signal.

Below a selected limiting torque, the torque command signal causes the wind turbine to operate substantially at the peak of the power coefficient versus velocity ratio optimum performance curve which, as a result, causes the turbine rotor to operate substantially at a selected constant velocity ratio. For increased wind speeds above the selected limiting torque, the generator torque command signal causes the turbine rotor to operate at speeds greater than dictated by the constant velocity ratio up to a speed limit.

In still further accord with the present invention, the generator torque command signal maximizes generator output by causing the wind turbine to operate substantially on the power coefficient versus velocity ratio optimum performance curve above the selected limiting torque until the speed limit is reached.

In still further accord with the present invention, the variable speed wind turbine controller is responsive to sensed turbine rotor speed and provides an aerodynamic torque command signal for commanding changes in the aerodynamic torque in order to produce selected aerodynamic forces while the wind turbine rotor is operating below a speed limit and to maintain the turbine rotor substantially at the speed limit at higher wind speeds capable of producing turbine rotor speeds above the speed limit. Of course, in this case, the wind turbine system also necessarily comprises an electro-hydraulic aerodynamic torque control, responsive to the aerodynamic torque signal for effecting the commanded aerodynamic torque changes.

In still further accord with the present invention, the variable speed wind turbine controller provides the generator torque command signal which commands increases in power output above a torque limit while maintaining a constant torque value at that torque limit and additionally provides an aerodynamic torque command signal that holds rotor thrust constant with increasing wind speed.

In still further accord with the present invention, the variable speed wind turbine controller provides the generator torque command signal which commands increases in power output above a torque limit and provides an aerodynamic torque command signal such that wind turbine thrust is limited so that tower cost and wind turbine drive system cost are optimally related to the value of increased energy capture attained.

In still further accord with the present invention, the variable speed wind turbine controller further comprises means for providing a turbine rotor speed reference signal and an integral control, responsive to a difference signal having a magnitude indicative of the difference in magnitude between the turbine rotor speed reference signal and the turbine rotor sensed speed signal for providing the aerodynamic torque command signal.

In still further accord with the present invention, the integral control for providing the aerodynamic torque command signal includes a calculator responsive to the sensed generator electrical power output signal and the sensed turbine rotor speed signal which provides a calculated wind speed signal indicative of effective full-disk speed, additional calculator means responsive to the turbine rotor speed and calculated wind speed signals for providing a velocity ratio signal having a magnitude indicative of the ratio of the magnitudes of the rotor speed and calculated wind speed signals, upper and lower limit means responsive to the velocity ratio signal for providing aerodynamic torque command signal maximum and minimum limit signals for limiting the magnitude of the aerodynamic torque command signal during shutdown and during normal operation or start-up, respectively.

The variable speed wind turbine system disclosed and claimed herein provides a particularly effective means of increasing the efficiency of a wind turbine energy source. This is accomplished by establishing a functional relationship between generator output power and speed which defines a desired generator operating speed for attaining increased power output. This is accomplished, in effect, by maneuvering generator speed to keep the velocity ratio constant at the value which maximizes the power coefficient. The fixed speed limitations of traditional wind turbines can be overcome using the control system functions disclosed herein. The maneuvering of generator speed to keep the power coefficient maximized is a highly efficient way of extracting energy from the wind.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
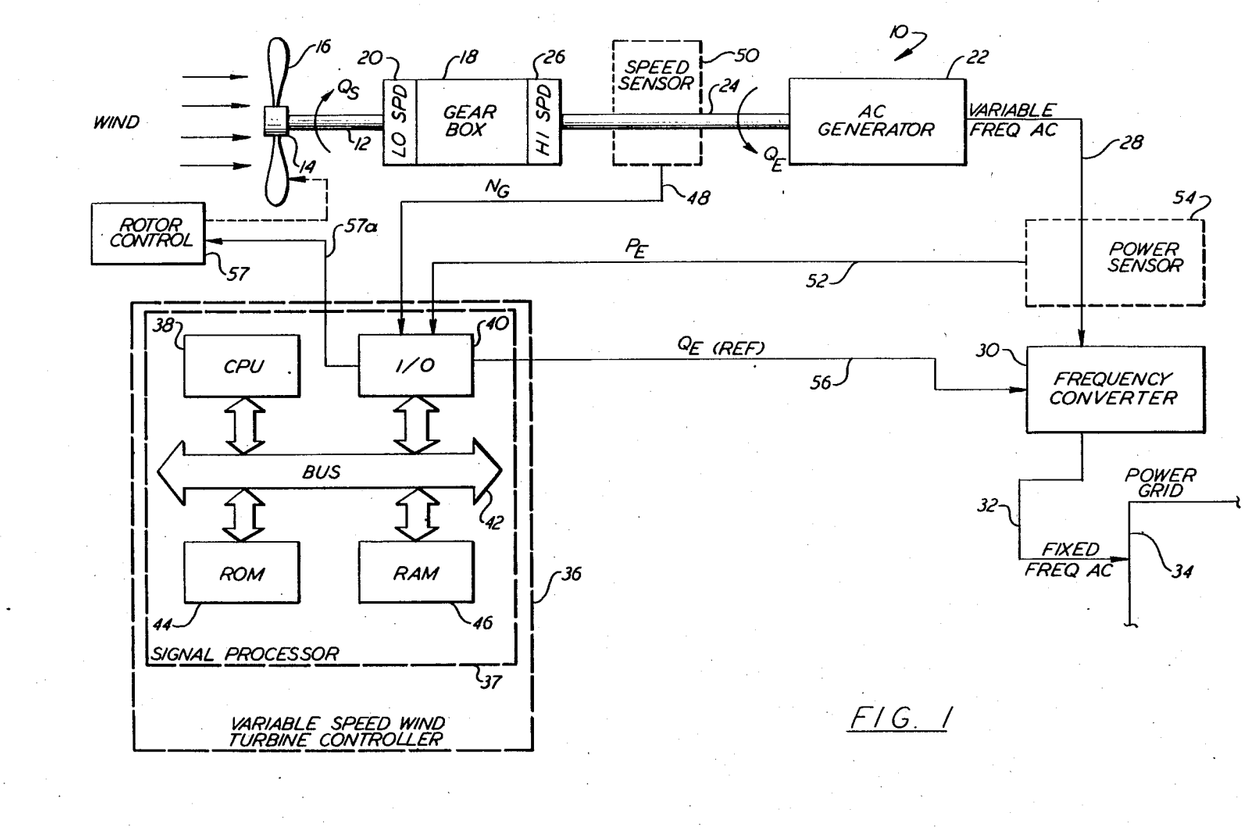
FIG. 1 is a simplified schematic block diagram illustration of a variable speed wind turbine, according to the present invention.

FIG. 1 is an illustration of a variable speed wind tubine 10, according to the present invention. A turbine rotor shaft 12 with a hub 14 at one end thereof has at least one blade 16 attached to the hub. A gearbox 18 has a low speed side 20 attached to the other end of the turbine rotor shaft. An AC generator 22 has a generator rotor shaft 24 attached to a high speed side 26 of the gearbox. The turbine rotor torque ($Q_s$) drives the generator rotor. The generator provides an air gap torque ($Q_E$) which opposes the input turbine rotor torque. The AC generator provides variable frequency AC on a line 28 to a frequency converter 30 which converts the variable frequency AC to a fixed frequency AC on a line 32 which is in turn provided to a power grid 34.

A variable speed wind turbine controller 36 includes a signal processor 37 in which there is a CPU 38 and an I/0 unit 40 which interfaces with a bus 42. The signal processor may also include a ROM unit 44 and a RAM unit 46 as well as other hardware (not shown). The signal processor's I/0 unit is responsive to a sensed generator speed signal ($N_G$) on a line 48 provided by a speed sensor 50 which is responsive to the generator shaft speed. The I/0 unit 40 is also responsive to a sensed power signal ($P_E$) on a line 52 from a power sensor 54 responsive to the magnitude of power provided on the line 28 to the frequency converter. The variable speed wind turbine controller 36, by means of the signal processor, determines what the generator air gap torque should be according to a function defining sensed power versus generator speed to obtain maximum efficiency. After determining what this level should be the signal processor provides, through its I/0 unit 40 a generator torque command signal on a line 56 to the frequency converter.

The frequency converter may, for example, be a cycloconverter or a rectifier-inverter pair linked by a DC link. Both of these types of frequency converters, and others, are well known in the art and need not be discussed in detail here. Suffice it to say that the electronic-type converters use phase-controlled SCRs to control the power flow through the frequency converter. This is done by controlling the phase angle of firing of the SCR gates with respect to the phase of the utility grid in order to control the flow of real and reactive power. Thus, there will generally be a trigger circuit (not shown) within the frequency converter which is responsive to the torque command signal and which provides triggering pulses for the SCRs within the frequency converter. A detailed description of the frequency converter and the triggering circuitry is unnecessary here and will not be presented as these details are well known in the art.

A rotor control 57 may be provided to provide aerodynamic torque control above a limiting torque in order to limit thrust. This may take the form of pitch or yaw control. An aerodynamic torque command signal is provided on a line 57a by the signal processor to the rotor control 57.

Figure 2:
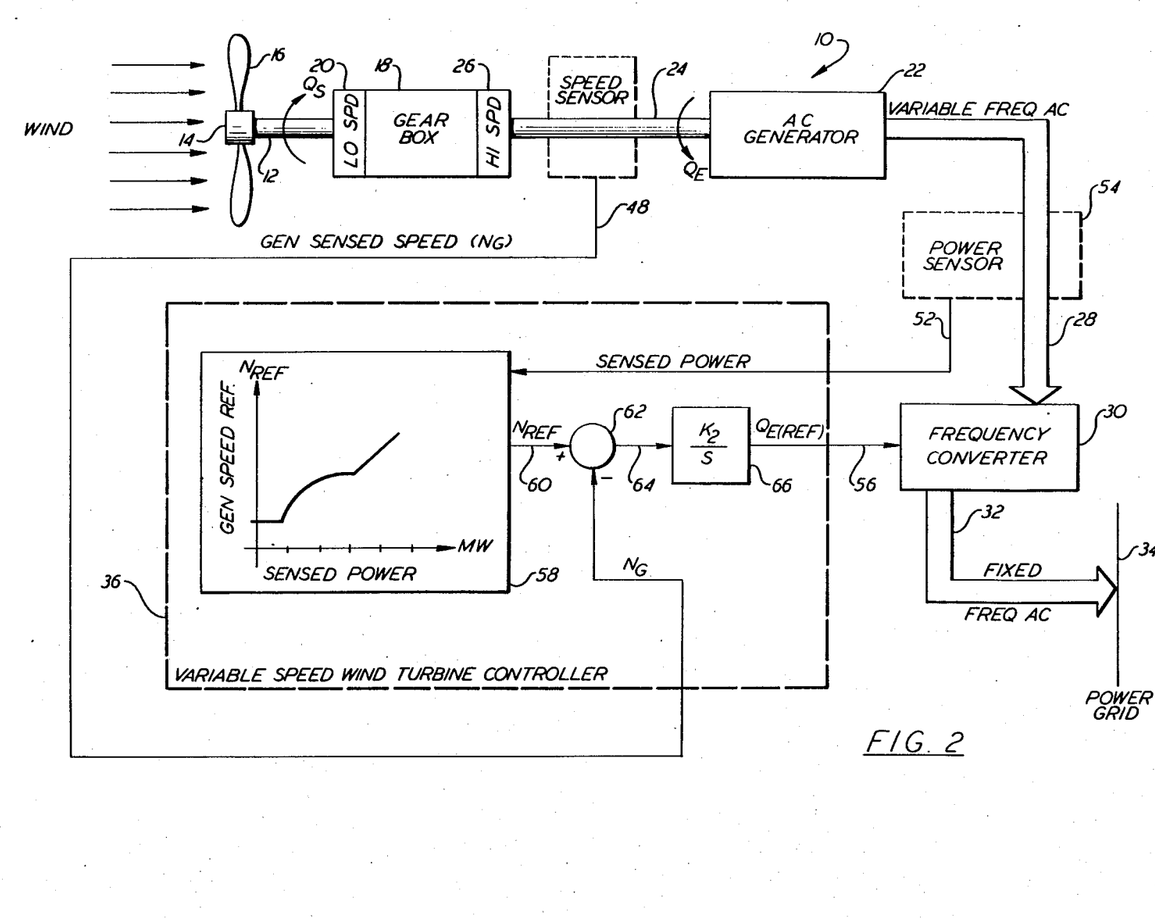
FIG. 2 is similar to FIG. 1 except including a system level illustration of the variable speed wind turbine controller of FIG. 1.

FIG. 2 is very similar to FIG. 1 except that it omits the rotor control 57 and shows the variable speed wind turbine controller in a system level format as an aid in understanding the central teachings of the present invention. In FIG. 2, the variable speed wind turbine controller is shown responsive to the same sensed speed and power signals 48, 52 and also providing the same command torque signal on the line 56 to the frequency converter 30. However, the signal processor hardware has been replaced by functional blocks which more fully illustrate the control approach taught by the present invention. A schedule 58 which may include a look-up table is responsive to sensed power signal on the line 52. The schedule includes a functional relationship between sensed power signal values and corresponding generator speed reference signal values. The speed reference signal ($N_{REF}$) is output on a line 60 to a summing junction 62 where a comparison is made between the speed reference signal on the line 60 and the sensed generator speed signal on the line 48. A difference signal on a line 64 is integrated by an integrator 66 which provides the torque command signal on the line 56 to the frequency converter 30. Thus, it will be seen that the function of the signal processor CPU 38, in conjunction, for example, with the ROM 44 of FIG. 1, which may include a look-up table, as illustrated in FIGS. 1 and 2, is to sense the level of power delivered by the generator and from that sensed level of power to determine the generator speed at which maximum efficiency is attained (by consulting a pre-programmed look-up table, ROM 44, or schedule 58). A speed reference signal is then generated by the schedule and compared with a generator sensed speed signal. The difference is integrated to provide a torque command signal to the frequency converter for controlling the power flow to the power grid 34 and hence for controlling the air gap torque in the AC generator.

Figure 3:
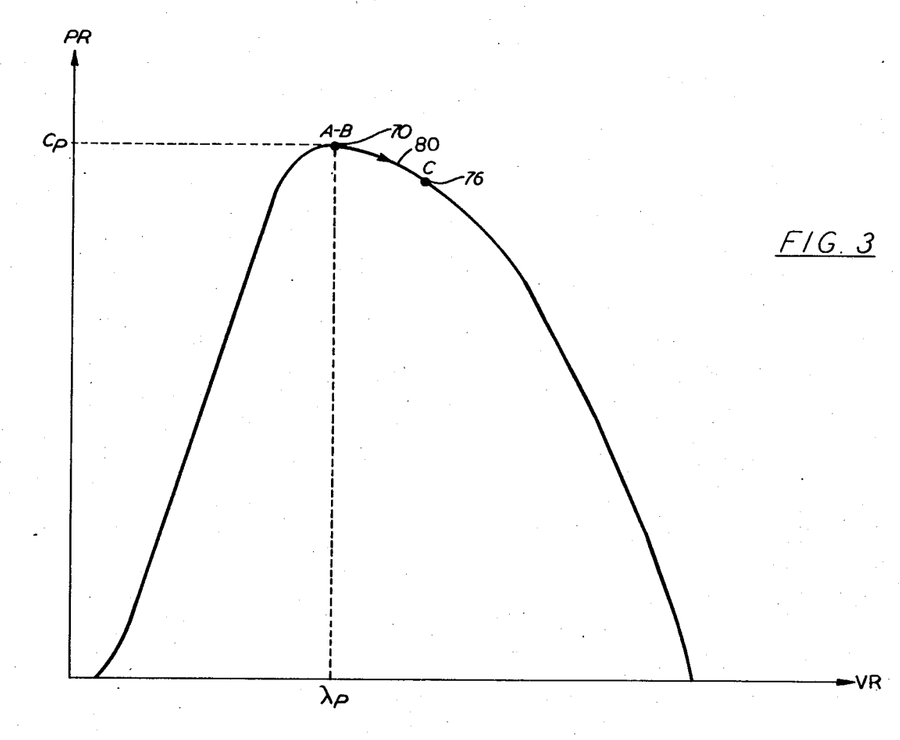
FIG. 3 is an illustration of a performance map for a particular wind machine illustrating the relation between the coefficient of performance, PR and the tip speed ratio or velocity ratio, VR.

FIG. 3 is an illustration of a performance map for a particular wind machine, illustrating the relation between the coefficient of performance and the tip speed ratio, otherwise known as the velocity ratio. For fixed speed wind turbines it was not possible to operate at the peak of the performance map since the wind speed varies. However, in a variable speed wind machine the velocity ratio can be held constant by having the tip speed follow the wind speed to maintain the ratio. Thus, in a variable speed wind turbine, for maximum efficiency, the design must attempt to keep the velocity ratio at the point at which the coefficient of performance is maximized. This point corresponds to point A-B (70) in FIG. 3.

Figure 4:
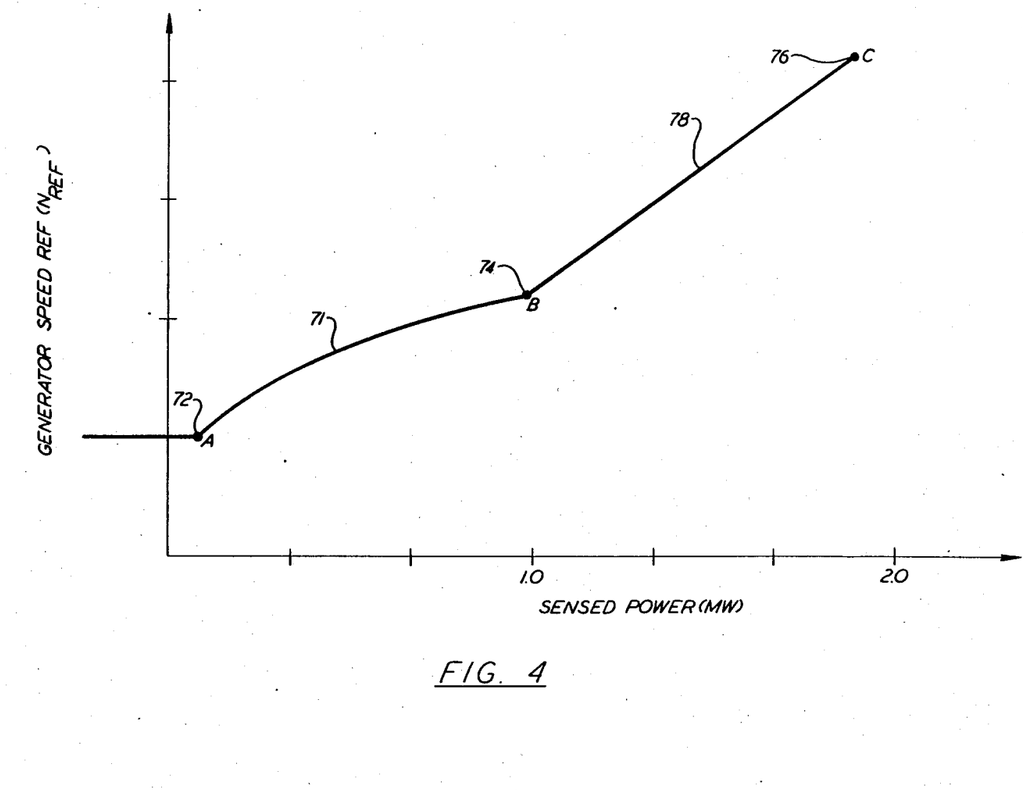
FIG. 4 is an illustration of the relation between generator output power and a selected generator speed reference signal for use in maneuvering the generator speed.

FIG. 4 is an illustration, according to the present invention, of the relation between generator output power and a selected generator speed reference signal for use in maneuvering the generator speed to keep the velocity ratio constant at the value which maximizes the coefficient of performance. FIG. 4 also illustrates the manner of maneuvering generator speed to increase power output above a point 74 of torque limit (B). A locus of point 71 from a point 72 (A) to the point 74 (B) describes the desired generator speed for various power levels for maximum efficiency during constant velocity ratio operation below a torque limit. Operation between the points 72, 74 (A, B) correspond to operation at the point 70 in FIG. 3. Thus, where the desired velocity ratio is a fixed constant and the corresponding coefficient of performance is a maximum fixed constant, it is possible to compute the relation between the generator output power and the necessary generator speed to obtain that power. I.e., since power is proportional to the cube of the wind speed and since generator speed is proportional to wind speed, then power is then necessarily proportional to generator speed cubed and generator speed is proportional to the cube root of power. Thus, FIG. 4, from the point 72 to point 74 along the locus of points 71 is a map which dictates the required maneuvering of generator speed relative to sensed power and, indirectly, to wind speed. Thus, by sensing generator output power and consulting the functional relation illustrated in FIG. 4, the required generator speed for maintaining the velocity ratio is obtained directly and efficiency is automatically maximized.

In co-pending application U.S. Ser. No. 799,046, entitled TORQUE CONTROL FOR A VARIABLE SPEED WIND TURBINE, invented by DiValentin et al, additional methodology and apparatus for increasing energy capture above the limiting torque point 74 has been disclosed and claimed. Since these methods and apparatus are fully described therein, they will be described herein only to the extent necessary to provide the general principles. For the particular variable speed wind turbine controller described and claimed herein, the DiValentin et al teachings dictate maneuvering the generator speed according to a locus of points 78 between point 74 (B) and point 76 (C) at which point a speed or power limit is reached. Thus, although the generator air gap torque is held constant, the rotor speed is allowed to increase in such a manner as to maximize the energy capture by staying on the performance map of FIG. 3 from point 70 to point 76 along a corresponding locus of points 80. It will be observed from FIG. 3 that the velocity ratio, above the torque limit, is increasing, and the coefficient of performance is decreasing. Although the maximum efficiency represented by point 70 can no longer be held, the locus of points 80 represents the best possible efficiency which may be extracted under the circumstances. Referring back to FIG. 4, the locus of points 78 corresponds to the locus of points 80 of FIG. 3 and similarly represents the best possible maneuvering of generator speed for given wind speeds.

Figure 5:
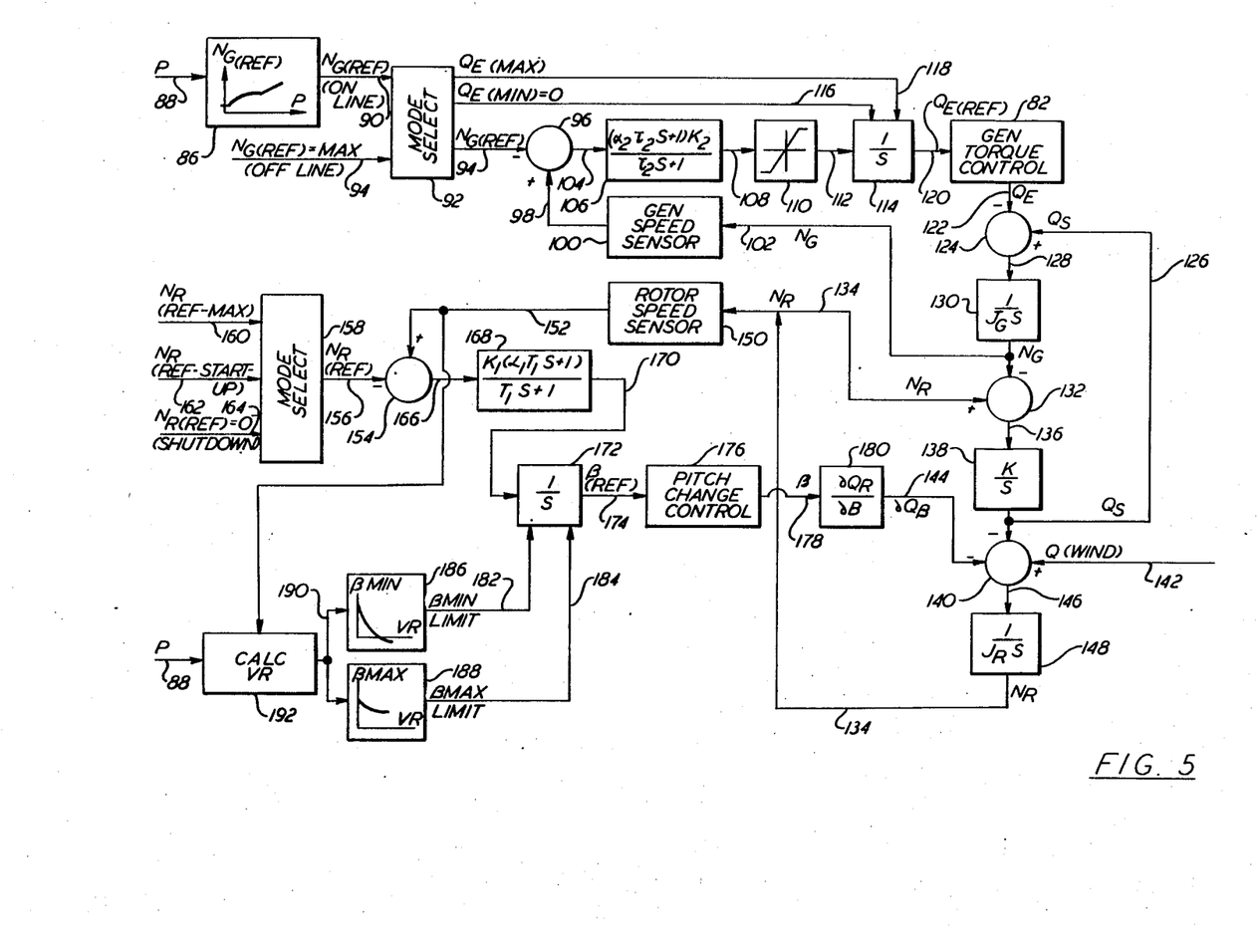
FIG. 5 is a simplified schematic block diagram illustration of a variable speed wind turbine, according to the present invention.

Referring now to FIG. 5, there is presented a simplified schematic block diagram illustration of a model of a variable speed wind turbine, including a controller therefor, according to the present invention. Below the torque limit of the wind turbine-generator, the control of FIG. 5 operates in a mode which controls generator torque by means of a generator torque control 82, similar to the frequency converter 30 of FIGS. 1 and 2. Above the torque limit, a pitch or yaw change control 176 becomes active and influences net torque by means of aerodynamic load changes. The aerodynamic load control 176 modifies power above the torque limit in order to capture maximum energy while limiting thrust loads at high wind speeds.

Thus, below the torque limit, a schedule 86, similar to the schedule 58 of FIG. 2, is responsive to a sensed output power signal on a line 88 indicative of the level of electrical power being delivered by the generator. The schedule normally provides a generator speed reference signal on a line 90 to a mode select unit 92 which is also responsive during start-up to a generator maximum speed reference signal on a line 94 which indicates an appropriate turbine speed for the wind speed during start-up and when reached, causes the mode select 92 to switchover to the signal on the line 90. During generator torque control "on-line" operation, the mode select 92 provides the generator speed reference on a line 94 to a summing junction 96 which is also responsive to a sensed generator rotor speed signal on a line 98 provided by a generator rotor speed sensor 100 which, in turn, is responsive to the actual generator rotor speed as indicated by a modelled speed signal on a line 102. A summed signal on a line 104 is provided to a dynamic lead compensation circuit 106 which provides a compensated signal on a line 108 to a rate limit 110, which is not necessary if the torque of the generator can be otherwise limited to satisfy the design requirements, which is normally the case. A rate limited signal on a line 112 is provided to an integrator 114 which is limited by a minimum torque signal on a line 116 and a maximum torque signal on a line 118. An integrated signal on a line 120 is provided as a command or reference signal to the generator torque control 82. The generator torque control 82 effects the commanded torque response in the generator air gap as indicated by a generator torque signal on a line 122. The generator torque signal on line 122 may be thought of as an electrical model of the actual generator torque response induced by the torque control 82. In fact, the discussion which follows will treat the turbine-generator as a model, but it should be understood that the model respresents an actual turbine-generator system. Thus, the generator torque signal on the line 122 is summed at a modelled junction 124 with a turbine shaft torque signal on a line 126 indicative of the torque on the turbine side of the gearbox. The summation at the junction 124 results in a signal on a line 128 indicative of the net torque on the generator rotor which is presented to an integrator 130 which integrates and scales the net torque signal on the line 128 to provide the generator speed signal on the line 102. The generator speed signal is provided to a junction 132 where it is summed with a turbine rotor speed signal on a line 134 to provide a speed difference signal on a line 136 to an integrator 138 which in turn provides the turbine shaft torque signal on the line 126. A junction 140 sums the shaft torque signal on the line 126 with a wind torque signal on a line 142 indicative of the torque provided by the wind to the turbine. Also summed at junction 140 is a signal on a line 144 indicative of the change in turbine rotor torque due to pitch changes. A resulting net torque signal on a line 146 indicative of the torque imbalance operating on the rotor as a whole is provided to an integrator 148 which provides the rotor speed signal on the line 134 which is sensed by a rotor speed sensor 150 which provides a sensed rotor speed signal on a line 152 to a junction 154 where it is summed with a rotor speed reference or command signal on a line 156. A mode select 158 provides a speed reference signal on a line 160 as $N_{R(REF)}$ on line 156 when the torque limit is reached. The mode select 158 also provides the speed reference signal on line 156 during start-up and shutdown by substituting signals on lines 162 and 164, respectively, for the normal operating signal on line 160.

An error signal on a line 166 is provided to a gain and lead compensation network 168 and a compensated signal on a line 170 is provided to an integrator 172. The integrator provides a pitch change reference or command signal on a line 174 to the pitch change control 176 which effects the commanded pitch change and provides a pitch change as indicated by a modelled signal on a line 178. The change in rotor torque induced by the pitch change, as indicated by a rotor torque differential change 180 (in response to the pitch change) provides the corresponding torque change signal on the line 144 to the summing junction 140, as discussed above.

The integrator 172 is limited by a pitch minimum limit signal on a line 182 and a pitch maximum limit signal on a line 184 which are provided, respectively, from limit circuits 186, 188. Limit circuit 186 is used during shutdown and limit circuit 188 is used during start-up and low wind conditions. the limit circuits are responsive to a calculated velocity ratio signal on a line 190 provided by a calculator circuit 192 which is responsive to the sensed rotor speed signal on the line 152 and the power output signal on the line 88. It calculates the velocity ratio depending on the values of these two input signals. The calculator means includes means responsive to both the sensed generator electrical power output signal and the sensed turbine rotor speed signal for providing a calculated wind speed signal indicative of effective full-disk wind speed. Thus, there will be additional means within the calculator 192 responsive to the turbine rotor speed and calculated wind speed signals for providing a velocity ratio signal having a magnitude indicative of the ratio of the magnitudes of the rotor speed and wind speed signals.

In point of fact, the velocity ratio calculation will normally require some reference to actual wind speed, as provided by a wind speed sensor, or by a yaw of pitch change sensor, which for example in FIG. 5 would be provided by a sensor (not shown) sensitive to the pitch change signal on line 178. It should be understood that such a signal would be required either in addition to or in lieu of the signals shown and although for simplicity has been omitted from the Figure.

It will be understood by those skilled in the art that the illustration of FIG. 5, including the functional blocks and wind turbine-generator model represent hardware components which are more fully illustrated in FIG. 1 and which can easily be adapted and modified to carry out the teachings of the present invention, by means of equivalent hardware or software.

Figure 6:
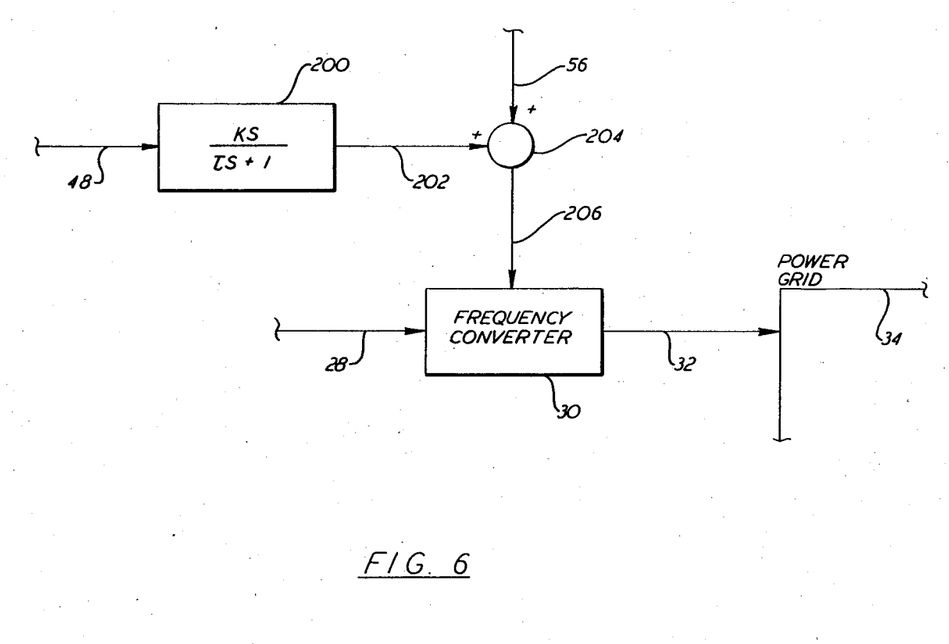
FIG. 6 is an illustration of a damping circuit for use with the wind turbine of FIGS. 1 or 2.

FIG. 6 is an illustration of a damping circuit 200 for use with the wind turbine of FIGS. 1 or 2 to damp a selected torsional mode of vibration. The damping circuit consists of a derivative over a lag, otherwise known as a washout filter or a high pass filter responsive to the sensed generator speed signal on the line 48 of FIGS. 1 and 2 for providing a damping signal on a line 202 to a summing junction 204 which is also responsive to the torque command signal on the line 56. An augmented torque command signal on a line 206 is provided to the frequency converter 30 and the selected torsional mode is suppressed using this technique. The derivative in the high pass filter serves the purpose of removing the augmentation signal on the line 202 at low frequencies, in this case. Of course, it will be understood that the frequency converter 30 illustrated in FIG. 6, corresponding to the frequency converter of FIGS. 1 and 2, is equivalent to the generator torque control 82 of FIG. 5 and a similar damping circuit could be used in the embodiment shown in FIG. 5 as well.

Thus, although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A variable speed wind turbine system having an optimum power coefficient versus velocity ratio performance curve, comprising:
    a turbine rotor shaft with a hub at one end with at least one blade attached to the hub;
    a gearbox, having a low speed side thereof attached to the other end of the turbine rotor shaft;
    an AC generator, having a generator rotor shaft attached to a high speed side of the gearbox, the generator providing variable frequency AC at a power output line thereof;
    sensing means, for sensing generator speed and generator electrical power output and for providing sensed signals indicative thereof;
    a variable speed wind turbine controller, responsive to the sensed signals indicative of generator speed and generator electrical power output, for providing a generator torque command signal for commanding maneuvers of the generator speed according to a function defining generator speed versus generator electrical power output which manuevers tend to cause the wind turbine to operate substantially on the wind turbine power coefficient versus velocity ratio optimum performance curve substantially at the peak thereof; and
    a frequency converter, electrically connected to the generator power output line and responsive to the generator output AC for converting the variable frequency AC to constant frequency AC, the frequency converter responsive to the generator torque command signal for controlling the magnitude of power flow through the converter, thereby effecting control of the generator torque.

2. The wind turbine of claim 1, wherein the variable speed wind turbine controller includes
    a high pass filter, responsive to the sensed generator speed signal for providing a damping signal; and
    a summing junction responsive to the generator torque command signal and the damping signal for providing an augmented generator torque command signal to the frequency converter for damping a selected torsional mode of vibration.

3. The wind turbine of claim 1, wherein the variable speed wind turbine controller includes a signal processor which includes
    a generator speed reference schedule, responsive to the sensed generator electrical power signal for providing a generator speed reference signal according to a speed reference signal versus sensed electrical power signal function; and
    an integral control, responsive to a difference signal having a magnitude indicative of the difference in magnitudes between the generator speed reference signal and the generator sensed speed signal for providing the generator torque command signal which, (a) below a selected limiting torque, as indicated by a corresponding selected limiting generator electrical power output signal magnitude, causes the wind turbine to operate substantially at the peak of the power coefficient versus velocity ratio performance curve and which, as a result, causes the turbine rotor to operate substantially at a selected constant velocity ratio, and which, (b) causes the turbine rotor to operate at speeds greater than those dictated by the constant velocity ratio for operation at speeds above the point where the limit torque is reached up to a speed limit.

4. The wind turbine of claim 3, wherein the generator torque command signal causes the wind turbine to operate substantially on the power coefficient versus velocity ratio optimum performance curve above the selected limiting torque until the speed limit is reached.

5. The wind turbine system of claim 1 wherein the sensing means includes an additional sensor for sensing turbine rotor speed for providing a sensed signal indicative thereof; wherein the variable speed wind turbine controller includes means responsive to the turbine rotor speed and generator electrical power signals for providing an aerodynamic torque command signal for commanding changes in the aerodynamic torque to, (a) produce selected aerodynamic forces while the wind turbine rotor is operating below a speed limit and (b) maintain the turbine rotor substantially at the speed limit at wind speeds capable of producing turbine rotor speeds above the speed limit; and, wherein the wind turbine system further comprises an electro-hydraulic aerodynamic torque control, responsive to the aerodynamic torque command signal for changing the aerodynamic torque of the turbine rotor in response to the commanded changes.

6. The wind turbine of claim 5, wherein the generator torque command signal remains constant while the aerodynamic torque command signal causes the wind turbine to operate substantially on a selected power coefficient versus velocity ratio performance curve above the selected limiting torque until the speed limit is reached.

7. The wind turbine of claim 5, wherein the variable speed wind turbine controller includes:

means for providing a turbine rotor speed reference signal; and an integral control, responsive to a difference signal having a magnitude indicative of the difference in magnitudes between the turbine rotor speed reference signal and the turbine rotor sensed speed signal for providing the aerodynamic torque command signal.

8. The wind turbine of claim 7, wherein the integral control includes:

calculator means, responsive to the sensed generator electrical power output signal and the sensed turbine rotor speed signal for providing a calculated wind speed signal indicative of effective full-disc wind speed;

means responsive to the turbine rotor speed and calculated wind speed signals for providing a velocity ratio signal having a magnitude indicative of the ratio of the magnitudes of the rotor tip speed and wind speed signals;

upper limit means, responsive to the velocity ratio signal for providing an aerodynamic torque command signal maximum limit signal for limiting the magnitude of the aerodynamic torque command signal during shutdown; and lower limit means, responsive to the velocity ratio signal for providing an aerodynamic torque command signal minimum limit signal for limiting the magnitude of the aerodynamic torque command signal during normal operation and during startup.

* * * * *